(12) United States Patent  (10) Patent No.: US 8,813,222 B1
Codreanu et al.  (45) Date of Patent: Aug. 19, 2014

(54) COLLABORATIVE MALWARE SCANNING

(75) Inventors: Dumitru Codreanu, Chisinau (MD); Mihai Neagu, Bucharest (RO); Mihai Chiriac, Bucharest (RO)

(73) Assignee: Bitdefender IPR Management Ltd., Nicosia (CY)

( * ) Notice: Subject to any disclaimer, the term of this patent is extended or adjusted under 35 U.S.C. 154(b) by 1051 days.

(21) Appl. No.: 12/356,677

(22) Filed: Jan. 21, 2009

(51) Int. Cl.
  *G06F 21/00* (2013.01)
  *G06F 21/56* (2013.01)
(52) U.S. Cl.
  CPC .................................. *G06F 21/56* (2013.01); *G06F 21/20* (2013.01)
  USPC .......................................................... 726/22
(58) Field of Classification Search
  USPC ............................ 713/188; 726/22, 23, 24, 25
  See application file for complete search history.

(56) References Cited

U.S. PATENT DOCUMENTS

| | | | |
|---|---|---|---|
| 5,960,170 A * | 9/1999 | Chen et al. .................. | 714/38.14 |
| 6,195,587 B1 | 2/2001 | Hruska et al. | |
| 6,944,772 B2 | 9/2005 | Dozortsev | |
| 6,963,978 B1 * | 11/2005 | Muttik et al. .................. | 713/188 |
| 7,020,895 B2 | 3/2006 | Albrecht | |
| 7,203,959 B2 | 4/2007 | Nachenberg et al. | |
| 7,257,842 B2 | 8/2007 | Barton et al. | |
| 7,302,706 B1 | 11/2007 | Hicks et al. | |
| 7,337,471 B2 | 2/2008 | Nachenberg et al. | |
| 7,383,580 B1 | 6/2008 | Frentz | |
| 7,412,450 B1 | 8/2008 | Bonwick et al. | |
| 7,836,174 B2 | 11/2010 | Lunde | |
| 8,127,358 B1 * | 2/2012 | Lee ................................ | 726/24 |
| 8,151,352 B1 | 4/2012 | Novitchi | |
| 8,302,193 B1 * | 10/2012 | Gardner et al. .................. | 726/24 |
| 2001/0005889 A1 * | 6/2001 | Albrecht ....................... | 713/201 |
| 2004/0098473 A1 | 5/2004 | Yodaiken | |
| 2004/0205419 A1 * | 10/2004 | Liang et al. ..................... | 714/57 |
| 2007/0016953 A1 * | 1/2007 | Morris et al. ................... | 726/24 |
| 2007/0234355 A1 | 10/2007 | Locker et al. | |
| 2007/0240221 A1 | 10/2007 | Tuvell et al. | |
| 2007/0266436 A1 * | 11/2007 | Ballard et al. .................. | 726/24 |

(Continued)

OTHER PUBLICATIONS

Chiriac, Mihai, "Tales from Cloud Nine," Virus Bulletin Conference, Geneva, Switzerland, p. 1-46, Sep. 24, 2009; available at http://www.virusbtn.com/pdf/conference_slides/2009/Chiriac-VB2009.pdf.

(Continued)

*Primary Examiner* — Jeffery Williams
(74) *Attorney, Agent, or Firm* — Law Office of Andrei D Popovici, PC

(57) ABSTRACT

In some embodiments, a malware detecting system is configured to conduct an iterative, collaborative scan of a target object (computer file or process), comprising a server-side scan and a client-side scan, and to assess the malware status of the target object according to the results of the client-side and server-side scans. The client-side scan comprises computationally-intensive operations such as virtual-environment emulation, decryption and data compression methods, while the server-side scan comprises database-intensive operations such as hash lookups. The information exchanged between client and server systems may be limited to relatively-compact data, such as hashes, which may amount to a few bytes per target object. Exemplary methods and systems described herein allow storing malware signature databases on the server side, thus reducing the burden of frequently delivering data-heavy signature updates to large numbers of customers, without requiring the server side to perform computationally-intensive scanning tasks for large numbers of customers.

22 Claims, 4 Drawing Sheets

(56) References Cited

U.S. PATENT DOCUMENTS

| | | | |
|---|---|---|---|
| 2008/0066075 A1 | 3/2008 | Nutter et al. | |
| 2008/0148407 A1* | 6/2008 | Katkar | 726/24 |
| 2008/0168564 A1 | 7/2008 | Lerouge et al. | |
| 2009/0007100 A1 | 1/2009 | Field et al. | |
| 2009/0158432 A1 | 6/2009 | Zheng | |
| 2009/0172820 A1 | 7/2009 | Watson | |
| 2009/0249470 A1 | 10/2009 | Litvin et al. | |
| 2009/0249472 A1 | 10/2009 | Litvin et al. | |
| 2009/0293125 A1* | 11/2009 | Szor | 726/24 |
| 2009/0300607 A1 | 12/2009 | Ferris | |

OTHER PUBLICATIONS

Oberheide, Jon et al., "CloudAV: N-Version Antivirus in the Network Cloud," USENIX Security Symposium, San Jose, CA, p. 1-16, Jul. 30, 2008; available at http://www.eecs.umich.edu/fjgroup/pubs/usenix08-cloudav.pdf.

Dinaburg et al., "Ether: Malware Analysis via Hardware Virtualization Extensions," 15th ACM Conference on Computer and Communications Security, Alexandria, Virginia, USA, p. 1-12, Oct. 27-31, 2008.

Nguyen et al., "MAVMM: Lightweight and Purpose Built VMM for Malware Analysis," 2009 Annual Computer Security Applications Conference, Honolulu, Hawaii, USA, p. 1-13, Dec. 7-11, 2009.

Hsieh, "Anti-Virus Deployment for VMWare View," VMWare Technical Notes, VMWare, Palo Alto, CA, p. 1-11, retrieved on Mar. 23, 2010; document contains note "Copyright 2009 VMWare".

McIntosh, "Xensocket: Interdomain transport for VMs," Xen Summit 2007, New York, NY, p. 1-18, Apr. 17, 2007.

Altor Networks, "Secure Virtualization for HIPAA Compliance," Altor Networks, Redwood City, CA, p. 1-3, retrieved on Mar. 11, 2010.

Altor Networks, "White Paper: The Need for Virtual Network Analysis," Altor Networks, Redwood City, CA, p. 1-6, retrieved on Mar. 11, 2010.

Altor Networks, "White Paper: Alternatives for Securing Virtual Networks," Altor Networks, Redwood City, CA, p. 1-5, retrieved on Mar. 11, 2010.

Altor Networks, "White Paper: 5 Best Practices to Protect Your Virtual Environment," Altor Networks, Redwood City, CA, p. 1-6, retrieved on Mar. 11, 2010.

Altor Networks, "Secure Virtualized Hosting," Altor Networks, Redwood City, CA, p. 1-4, retrieved on Mar. 11, 2010.

U.S. Appl. No. 12/792,317, filed Jun. 2, 2010, Chiriac et al., "Virtual Machine Protection Systems and Methods".

Office Action Mailed May 11, 2012 for U.S. Appl. No. 12/792,317, filed Jun. 2, 2010.

* cited by examiner

COLLABORATIVE MALWARE SCANNING

BACKGROUND

The invention relates to systems and methods for detecting viruses and other malware, and in particular to anti-malware detection systems using server-side scanning.

Known methods of scanning for malicious software (malware) such as viruses, worms, and Trojan horses include behavior-based methods and content-based methods.

Behavior-based methods typically involve allowing a suspected program to execute in an isolated virtual environment, commonly called a sandbox, and observing the program's resulting behavior. Programs that exhibit malicious behavior are identified and removed or contained. Conventional behavior-based methods are usually computationally intensive and may compete for resources with other software, thus reducing a user's productivity.

In content-based methods, the contents of a suspected file are commonly compared to a database of known malware-identifying signatures. If a known virus signature is found in the suspected file, the file is labeled as infected. The malware signature database is stored on the user's local hard drive, and is updated by downloading the signatures of newly discovered malware from a server. The size of such signature databases has been increasing rapidly. Such databases may comprise millions of malware signatures, amounting to several tens of megabytes of data or more. The performance of common content-based methods may depend on the capability to deliver signature updates from an anti-malware software producer's servers to a large number of customers on a regular basis—sometimes several times a day—in order to keep pace with rapidly-evolving threats.

SUMMARY

According to one aspect, a malware detection system comprises: a client scan engine configured to perform on a client computer system a client-side part of a collaborative scan of a target object to produce a client-side scan result; and a client communication manager connected to the client scan engine and configured to: send a first object data indicator for the target object from the client computer system to a malware detection server system, and receive at the client computer system a first server-side scan result of a first server-side part of the collaborative scan of the target object, wherein the first server-side part of the collaborative scan is performed by the malware detection server system according to the first object data indicator.

According to another aspect, a malware detection method comprises: performing a client-side part of a collaborative scan of a target object on a client computer system, to produce a client-side scan result; sending a first object data indicator for the target object from the client computer system to a malware detection server system; and receiving at the client computer system a first server-side scan result of a first server-side part of the collaborative scan of the target object, wherein the first server-side part of the collaborative scan is performed by the malware detection server system according to the first object data indicator.

According to another aspect, a malware detection system comprises: means for performing a client-side part of a collaborative scan of a target object on a client computer system, to produce a first result; means for sending a object data indicator from the client computer system to a malware detection server system; and means for receiving at the client computer system a server-side scan result of a server-side part of the collaborative scan of the target object, wherein the server-side part of the collaborative scan is performed by the malware detection server system according to the object data indicator.

According to another aspect, a malware detection system comprises: a server communication manager configured to perform a plurality of malware detection transactions with a plurality of client computer systems, a malware detection transaction comprising: receiving at a malware detection server system a first object data indicator for a target object from a client computer system, and sending a first server-side scan result of a first server-side part of a collaborative scan of the target object from the malware detection server system to the client computer system, wherein the collaborative scan includes the server-side part and a client-side part performed by the client computer system; and a server scan engine connected to the server communication manager and configured to perform the first server-side part of the collaborative scan on the malware detection server system according to the first object data indicator.

According to another aspect, a malware detection method comprises performing a plurality of malware detection transactions with a plurality of clients, a malware detection transaction comprising: receiving at a malware detection server system a first object data indicator for a target object from a client computer system; performing a first server-side part of a collaborative scan of the target object on the malware detection server system, wherein the collaborative scan includes the first server-side part and a client-side part performed by the client computer system, and wherein the first server-side part of the collaborative scan is performed according to the first object data indicator; and sending a first server-side scan result of the first server-side part of the collaborative scan from the malware detection server system to the client computer system.

According to another aspect, a malware detection system comprises: means for receiving at a malware detection server system a plurality of malware detection requests from a plurality of clients; means for receiving at the malware detection server system an object data indicator for a target object from a client computer system; means for performing a server-side part of a collaborative scan of the target object, wherein the collaborative scan includes the server-side part and a client-side part performed by the client computer system, and wherein the server-side part of the collaborative scan is performed according to the object data indicator; and means for sending a server-side scan result of the server-side part of the collaborative scan of the target object from the malware detection server system to the client computer system.

BRIEF DESCRIPTION OF THE DRAWINGS

The foregoing aspects and advantages of the present invention will become better understood upon reading the following detailed description and upon reference to the drawings where.

DETAILED DESCRIPTION OF PREFERRED EMBODIMENTS

In the following description, it is understood that all recited connections between structures can be direct operative connections or indirect operative connections through intermediary structures. A set of elements includes one or more elements. Any recitation of an element is understood to refer to at least one element. A plurality of elements includes at least two elements. Unless otherwise required, any described method steps need not be necessarily performed in a particular illustrated order. A first element (e.g. data) derived from a second element encompasses a first element equal to the second element, as well as a first element generated by processing the second element and optionally other data. Making a determination or decision according to a parameter encompasses making the determination or decision according to the parameter and optionally according to other data. Unless otherwise specified, an indicator of some quantity/data may be the quantity/data itself, or an indicator different from the quantity/data itself. Computer programs described in some embodiments of the present invention may be stand-alone software entities or sub-entities (e.g., subroutines, code objects) of other computer programs. Unless otherwise specified, a hash is an output of a hash function. Unless otherwise specified, a hash function is a mathematical transformation mapping a sequence of symbols (e.g. characters, bits) into a number or bit string. Computer readable media encompass storage media such as magnetic, optic, and semiconductor media (e.g. hard drives, optical disks, flash memory, DRAM), as well as communications links such as conductive cables and fiber optic links. According to some embodiments, the present invention provides, inter alia, computer systems programmed to perform the methods described herein, as well as computer-readable media encoding instructions to perform the methods described herein.

The following description illustrates embodiments of the invention by way of example and not necessarily by way of limitation.

Figure 1:
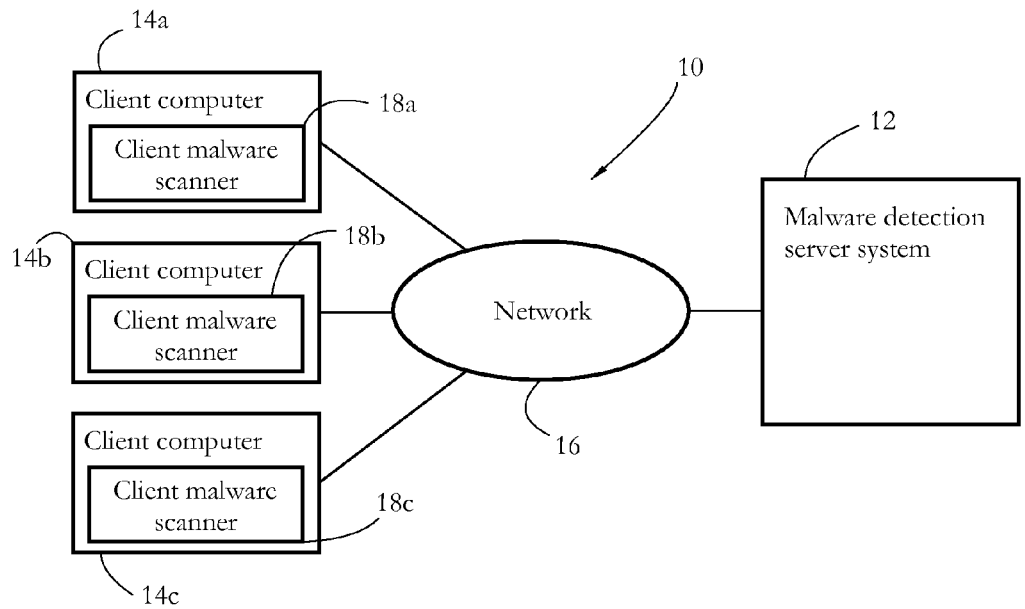
FIG. 1 shows an exemplary malware detection system according to some embodiments of the present invention.

FIG. 1 shows an exemplary malware detection system 10 according to some embodiments of the present invention. System 10 comprises a set of client computer systems 14a-c and a malware detection server system 12. Client computer systems 14a-c may represent end-user computers each having a processor, memory, and storage, and running an operating system such as Windows, MacOS or Linux. In some embodiments, client computer systems may represent individual customers, or several client computer systems may belong to the same customer. In some embodiments, one of systems 14a-c may be a server computer such as a mail server, in which case malware detection services may be used to identify malware present in emails or other messages sent to multiple clients, and to take appropriate action (e.g. remove or quarantine malware-infected items) before the messages are delivered to the clients. A network 16 connects client computer systems 14a-c and malware detection server system 12. Network 16 may be a wide-area network such as the Internet. Parts of network 16, for example a part of network 16 interconnecting client computer systems 14a-c, may also include a local area network (LAN). Each client computer system 14a-c may include a client malware scanner 18a-c, which may be a computer program. In some embodiments, malware scanner 18a-c may be a stand-alone application, or may be an anti-malware module of a security suite having antivirus, firewall, anti-spam, and other modules.

In some embodiments, each client malware scanner 18a-c is configured to conduct a client-side part of a client-server collaborative scan to detect malware-infected data objects stored on computer-readable media forming part of client computer system 14a-c (e.g. memory, hard drive), or on computer-readable media connected to system 14a-c (e.g. memory stick, external hard drive, network devices, etc.). Data objects scanned by each malware scanner 18a-c include computer files and processes. Each process may include a set of loaded memory modules (i.e. loaded images of a target executable file and its referenced dynamic linked libraries), as well as any additional files corresponding to the loaded memory modules. A data object may be considered infected if it contains at least a part of a malicious software entity (e.g. virus, worm, Trojan).

Figure 2:
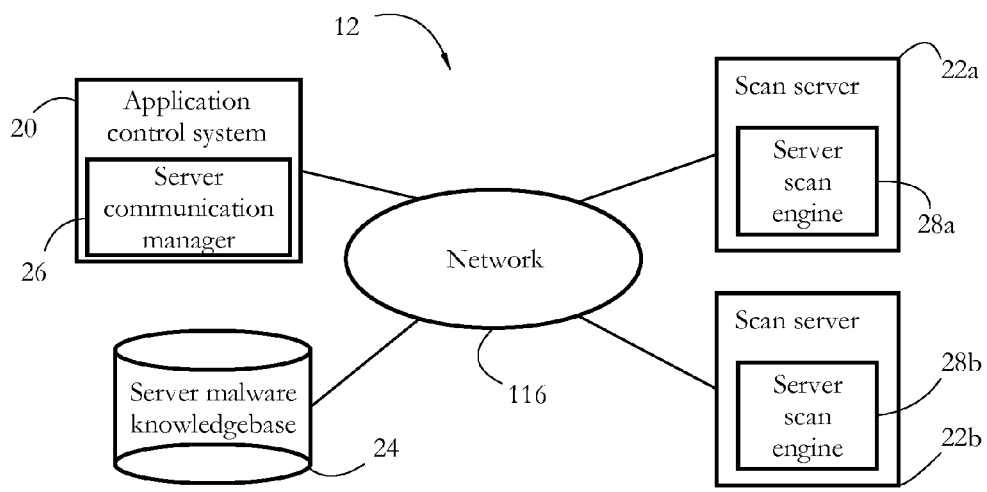
FIG. 2 shows the structure of an exemplary malware detection server system according to some embodiments of the present invention.

FIG. 2 illustrates an exemplary structure of malware detection server system 12 according to some embodiments of the present invention. System 12 comprises an application control system 20, a set of scan servers 22a-b, and a server malware knowledgebase 24, all connected via a inter-server network 116. Network 116 may include a wide-area network and/or a LAN. In some embodiments, application control system 20 is a computer comprising a server communication manager 26, which may be a computer program. Scan servers 22a-b may be individual computer systems, each including a processor, memory and storage. Scan servers 22a-b include respective server scan engines 28a-b, which may be a computer program.

Scan engines 28a-b are configured to perform a set of server-side malware detection operations described below. In some embodiments, scan engines 28a-b may be distinct computer programs, or distinct instances of the same program. For example, each scan engine 28a-b may be configured to perform malware detection according to a distinct method (e.g., engine 28a may employ heuristic analysis, while engine 28b may employ hash lookup). In another example, engines 28a-b may employ the same malware detection method, while each engine scans a distinct target object or a distinct part of the same target object. In yet another example, each of engines 28a-b may be configured to detect a distinct category or subset of malware agents.

In some embodiments, server communication manager 26 is configured to perform a plurality of malware detection transactions with client computer systems 14a-c, as described in detail below.

In some embodiments, server malware knowledgebase 24 may be stored, in part or entirely, on computer-readable media not forming part of malware detection server system 12, in which case access of engines 28a-b to knowledgebase 24 may be provided remotely via networks 16, 116.

In some embodiments, server malware knowledgebase 24 comprises a set of malware data and/or malware detection method parameters enabling the operation of server scan engines 28a-b. Exemplary server malware knowledgebases may include a set of malware-identifying signatures, a set of file names, a set of file sizes and/or file location identifiers (e.g. file paths), a set of malware behavior and/or heuristic pattern data, and a set of hashes, among others. In some embodiments, a hash is a number or a bit string resulting from applying a hash function to a section of the target object. Exemplary hash functions include checksum, cyclic redundancy check (CRC), and various cryptographic hash functions such as message-digest algorithms (e.g., MD5) and secure hash algorithms (SHA).

Knowledgebase 24 may include a set of universal offset hashes, calculated for each of a reference set of infected data objects. In some embodiments, universal offset hashes are hashes of object-independent and/or malware independent sections of a target region of a malware-infected data object. Exemplary target regions include the first 4 kilobytes of the data object (for files), and the first 4 kilobytes beginning with the portable executable header (PE header, for processes). In some embodiments, universal offset hashes may include CRC's of the following sections of the target region: the first 32 bytes (bytes 0→31), the first 512 bytes (bytes 0→511), the first 2 kB (bytes 0→2047), the last 32 bytes (bytes 4064→4095), the last 512 bytes (bytes 3584→4095), and the last 2 kB (bytes 2048→4095) of the target region, respectively. In some embodiments, if a universal offset hash is not considered relevant, or cannot be calculated (e.g. if the file is smaller than the size of the target region), the respective hash is set to 0.

Malware knowledgebase 24 may store universal offset hashes together with indicators of association with a file name and/or indicators of association with the infecting agent, as illustrated in Table 1 for several computer files:

TABLE 1

| Malware Agent | Hash 1 [first 32B] | Hash 2 [first 512B] | Hash 3 [first 2kB] | Hash 4 [last 32B] | Hash 5 [last 512B] | Hash 6 [last 2kB] |
|---|---|---|---|---|---|---|
| Trojan.Generic.971610 | FA873956 | C7CA1B4B | 9D79E378 | 0 | 0 | 0 |
| Trojan.VB.AP | 34197D98 | EE7EOB15 | 01DEA751 | 0E174561 | 4D558A87 | E6F5AA52 |
| Win32.Worm.Mytob.DBF | 089200E6 | 80FA8D46 | AAC48BAF | 5BBDD775 | 4DA97D1E | CA90B01A |
| Backdoor.IRCBot.ACEO | 5A1DCAAE | 78884FAC | 6B308902 | 0E174561 | 4D558A87 | E6F5AA52 |

An exemplary record of universal offset hashes for several processes is shown in Table 2:

TABLE 2

| Malware agent | Hash 1 [first 32B] | Hash 2 [first 512B] | Hash 3 [first 2kB] | Hash 4 [last 32B] | Hash 5 [last 512B] | Hash 6 [last 2kB] |
|---|---|---|---|---|---|---|
| Trojan.Generic.971610 | 1884418F | 464AFBA2 | 89A10485 | 67EBC5C1 | 8246D04E | 9FCEF14E |
| Trojan.VB.AP | 0 | 0 | 0 | F8E276BD | 45D1E345 | E6F5AA52 |
| Win32.Worm.Mytob.DBF | C09A89F9 | 6B56BC58 | B2A3A845 | DD171E2B | DB2C9B22 | 98DE8B6A |
| Backdoor.IRCBot.ACEO | AA686AC2 | 93D2F88C | BB5A9592 | C5D35E03 | 64C68989 | 53CDFDEB |

Knowledgebase 24 may also include signature hashes calculated for each of a set of malware agents. In some embodiments, signature hashes are malware-identifying hashes (e.g. CRC) of malware-specific target regions of infected objects. An exemplary record of signature hashes may include the address and size of the target region, together with indicators of association with the infecting agent, as illustrated in Table 3. Addresses of target regions may be virtual addresses: for files, they are translated to the actual file offset; for processes or memory modules, they are mapped to a memory address.

TABLE 3

| Malware agent | Address | Size | CRC |
|---|---|---|---|
| Trojan Generic.971610 | 1000 | 8E7A | 01F71534 |
| Trojan.VB.AP | 00001150 | 00004F84 | D84310F0 |
| Win32.Worm.Mytob.DBF | 00003137 | 000017D4 | AD12C0B3 |
| Backdoor.IRCBot.ACEO | 00001110 | 0000014E | 01E8B9F3 |

In some embodiments, knowledgebase 24 may also include hashes of a reference set of clean files. Examples of such hashes are MD5 hashes of entire files which are known not to be infected (e.g. original versions of executable files provided by software producers, etc.).

Figure 3:
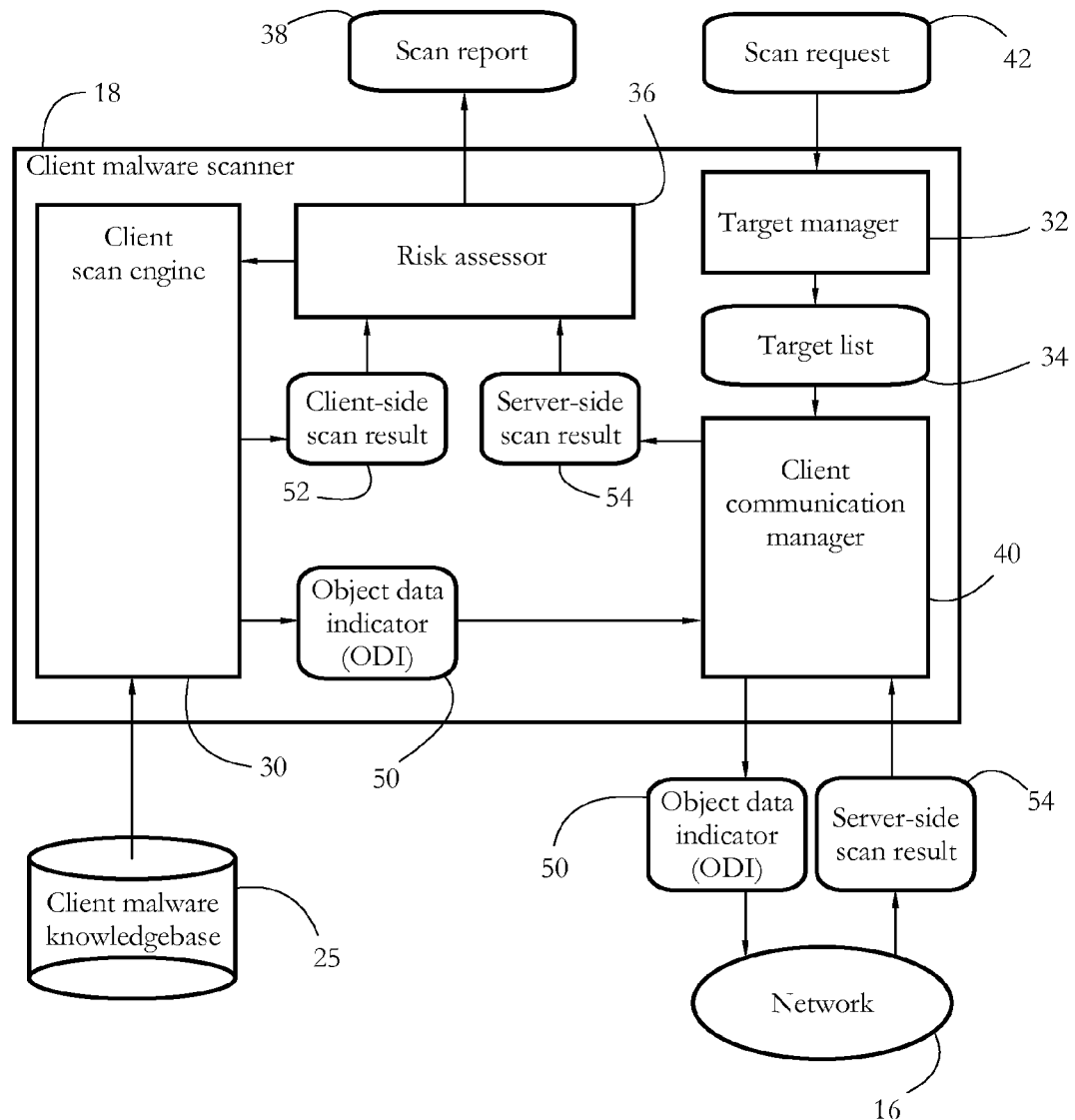
FIG. 3 shows a diagram of an exemplary client malware scanner according to some embodiments of the present invention.

FIG. 3 is a diagram of an exemplary client malware scanner 18 forming part of one of client computer systems 14a-c (FIG. 1), according to some embodiments of the present invention. Client malware scanner 18 comprises a target manager 32, a client communication manager 40 connected to target manager 32, a risk assessor 36 connected to client communication manager 40, and a client scan engine 30 connected to communication manager 40 and risk assessor 36.

In some embodiments, target manager 32 receives a scan request 42 and generates a target list 34 comprising a set of names and/or identifiers (e.g. pointers, tags) of target objects to be scanned for malware. In some embodiments, scan request 42 may comprise an object location indicator (e.g. a path to a file or application, a memory address) and/or an action indicator specifying the action to be performed by scanner 18 (e.g., scan, disinfect) in relation to the respective object. Scan request 42 may be generated as a result of user input. For example, a user may request a malware scan of a file, or of the contents of an email message, or of the contents of a peripheral device such as a memory stick. Another exemplary scan request 42 comprises a system scan, requiring the assessment of the contents of the entire file system and/or memory of the respective client computer system 14. In some embodiments, scan request 42 may be generated as a result of a system event, such as opening a file or launching an application.

Items of target list 34 may include contents of one or more drives or folders, contents of a set of memory modules, and/or contents of email or other electronic messages to be scanned for malware. Target list 34 may include executable (e.g. portable executable, .exe., .cmd), library (e.g. .dll), batch (.bat), archive (e.g. .zip, .tar), script (e.g. Javascript, Visual Basic Script), macro (e.g. Microsoft Office macros), and other content capable of malicious functionality. Each item on list 34 may receive a unique identifying tag (ID), which is preserved until the end of the scanning process for the respective item. If the target object is a process, each of the memory modules associated with the respective process may receive a distinct ID. An exemplary target list 34 compiled in response to a system scan request on a computer running Microsoft Windows operating system may include executables from the WINDIR folder, executables from the WINDIR/system32 folder, executables of the currently running processes, dynamic link libraries (DLL) imported by the currently running processes, and executables of all installed system services, among others. In some embodiments, target list 34 may include files/processes targeted by malware programs considered most widespread and active at the time of initiation of scan request 42. Lists of files and/or processes associated with commonly encountered malware may be maintained by malware detection server system 12 and made available to client computer systems 14a-c via periodic and/or on-demand software updates over network 16.

In some embodiments, target manager 32 is connected to client scan engine 30 and may instruct engine 30 to perform a preliminary malware scan of the contents of target list 34. Such a preliminary scan may identify a subset of target objects from list 34 that do not require server-side scanning (e.g. clean files), in which case target manager 32 may remove the identified subset of objects from list 34. The preliminary scan may employ heuristic methods such as determining whether the contents of a file have changed since the latest scan of the file. If the contents have not changed, the file may be removed from list 34. Another example of heuristic determines if the content of a memory module differs from that of its corresponding disk image, and requesting a scan only when a difference is detected.

In some embodiments, client communication manager 40 is configured to receive target list 34 and to coordinate the client-side of communication between the respective client computer system 14 and malware detection server system 12, performed in order to conduct a collaborative client-server scan of target objects on list 34. For each target object, the collaborative client-server scan may proceed iteratively. In every iteration, client communication manager 40 may receive from client scan engine 30 an object data indicator (ODI) 50 corresponding to the respective target object, may forward ODI 50 to malware detection server system 12 over network 16, may receive a server-side scan result 54 computed at system 12 according to ODI 50, and may subsequently make scan result 54 available to risk assessor 36.

An exemplary iterative collaborative client-server scan may proceed as follows: in a first iteration, a first ODI computed for a target object is sent from client computer system 14 to server system 12. Upon receiving the first ODI, subsystems of server system 12 may perform a first server-side part of the collaborative scan of the target file, and return a first server-side scan result to client system 14. Depending on the contents of the first server-side scan result, client system 14 may launch a second iteration of the collaborative scan. A second iteration is called for when, for example, the malware status of the target object could not be determined unambiguously in the first iteration. In the second iteration, client system 14 may compute a second ODI for the target file and send the second ODI to server system 12. System 12 may further perform a second server-side part of the collaborative scan of the target file and return a second server-side scan result to client system 14. Several consecutive iterations of client-server scanning may proceed in this way.

In some embodiments, object data indicator 50 comprises a set of indicators of various features of a target object, computed by client scan engine 30. Exemplary ODIs 50 may comprise a set of universal offset and/or signature hashes computed for the target object, or an actual section of the target object. Other exemplary ODIs 50 include a file name, a file path indicator, and a size of a target object. Other ODIs 50 may include the entire target object itself, identifying data generated by processing the target object, or identifying properties of the target object.

In some embodiments, server-side scan result 54 comprises a result of the server-side part of the collaborative scan of a target object. Result 54 may include a tag identifying the target object, a malware status indicator of the target object (e.g. infected, suspect, unknown) and/or a set of identifiers of malware agents infecting or possibly infecting the target object. Result 54 may comprise a set of identifiers of the malware-detection methods (e.g. hash lookup) and a set of method-related parameter values (e.g. size and location within the target object of the hashed data section) employed in the server-side part of the collaborative scan of the target object. In some embodiments, server-side scan result 54 may also include a client-side scan request or an ODI request in relation to the target object. An exemplary client-side scan request comprises a request for emulation of a set of instructions from the target object. An exemplary ODI request comprises a request for a CRC of a particular section of the target object.

In some embodiments, risk assessor 36 receives server-side scan result 54 from client communication manager 40. When server-side scan result 54 comprises a client-side scan request, risk assessor 36 may instruct client scan engine 30 to perform the client-side part of the collaborative scan of the respective target object according to the scan request (for example, to emulate 2 million instructions of the target process). Some embodiments of risk assessor 36 are configured to issue a client-side scan request to engine 30 even when server-side scan result 54 does not contain a scan request. For example, risk assessor 36 may issue a scan request when the malware status of the target file could not be established by server system 12. In another embodiment, risk assessor 36 may issue a client-side scan request to client scan engine 30 when the target object has been labeled as clean by server system 12 (such a measure may be used as an extra precaution). When server-side scan result 54 comprises an ODI request, risk assessor 36 may forward the ODI request to client scan engine 30.

In response to each client-side scan request, risk assessor 36 may receive a client-side scan result 52 from client scan engine 30. Upon receiving result 54 from server system 12 and result 52 from client scan engine 30, risk assessor 36 may compute a unified, client-server assessment of the malware status of target objects from list 34, and may output a scan report 38, which may be further processed for display and/or displayed to a user by a subsystem of client malware scanner 18. For each target object, report 38 may include a label (e.g., clean, infected, suspect, unknown) and an indicator of an association between the label and the respective object. Report 38 may also include for every target object an identifier of the malware program infecting the file, and/or a record of the client-server collaborative scan of the file, listing e.g. the scan methods employed in the server-side and/or client side parts of the collaborative scan and/or a description of the decision process involved in the risk assessment of the target object. In some embodiments, report 38 may include status assessment only of infected files and files suspected of infection. Additional subsystems of client malware scanner 18 may further process target objects labeled as infected, to e.g. delete or quarantine respective target objects, or replace infected target objects with clean versions.

In some embodiments, client scan engine 30 receives client-side scan requests and/or ODI requests from risk assessor 36. Client-side scan requests may originate at the malware detection server system 12 or at risk assessor 36, as described above. Upon receiving a client-side scan request, engine 30 may perform a client-side part of the collaborative scan of the target object to produce a client-side scan result 52, and may forward result 52 to risk assessor 36. Upon receiving a ODI request, engine 30 may compute a ODI for the target object, and forward the ODI to client communication manager 40. Further examples of situations in which server-side scan result 54 may contain an ODI request and/or a client-side scan request are discussed below, as part of the description of the operation of malware detection server system 12.

In some embodiments, malware-detection methods implemented by client scan engine 30 include string searching algorithms and behavior-based methods such as virtual environment emulation, among others. Engine 30 may comprise subsystems configured to compute object data indicators such as various types of hashes. Some embodiments of scan engine 30 may also comprise subsystems configured to perform data decryption operations and/or data compression operations. The output of client scan engine 30 is client-side scan result 52, which may include a tag identifying the target object, a malware status indicator of the target object (e.g., infected, unknown), and/or a set of identifiers of malware agents infecting the target object. Result 52 may also include a set of identifiers of malware detection methods (e.g. emulation) and a set of method-related parameter values (e.g. number of emulated instructions) employed in the client-side part of the collaborative scan of the target object.

To execute the client-side part of the collaborative scan of the target object, client scan engine 30 may interact with a client malware knowledgebase 25 comprising a set of malware data and/or detection method parameters involved in the operation of client scan engine 30. Client malware knowledgebase 25 may comprise a set of malware-identifying signatures, a set of malware behavior and/or heuristic patterns, and a set of parameters employed in data unpacking and/or decryption operations, among others. The contents of client malware knowledgebase 25 may be stored on computer-readable media connected to client computer system 14 and may kept up to date by periodic and/or on-demand software updates over network 16.

Figure 4:
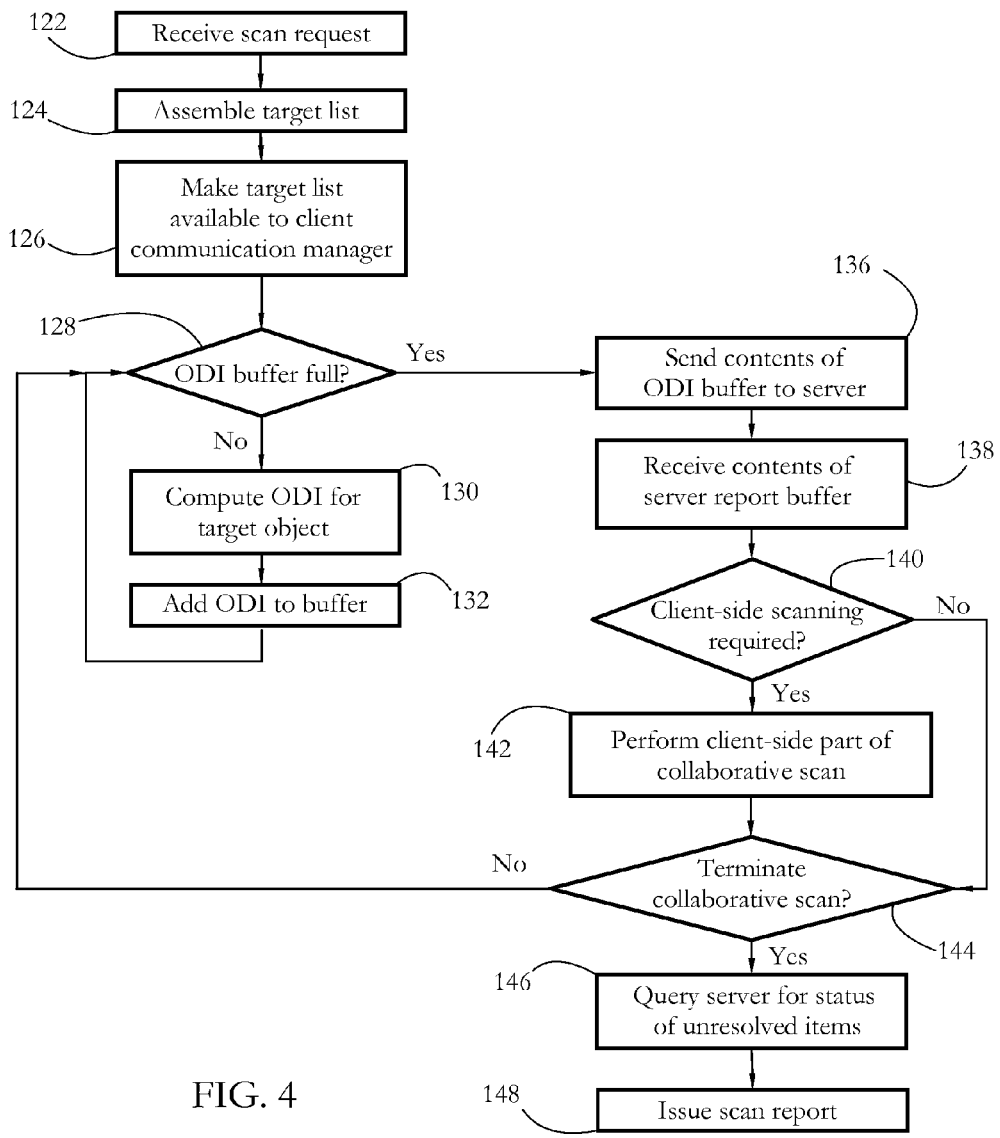
FIG. 4 shows an exemplary sequence of steps performed by the client malware scanner of FIG. 3 according to some embodiments of the present invention.

FIG. 4 illustrates an exemplary sequence of operations performed by client malware scanner 18 as part of a collaborative scan, according to some embodiments of the present invention. In a step 122, target manager 32 (see FIG. 3) receives scan request 42. In a step 124, manager 32 assembles target list 34 corresponding to scan request 42, and makes list 34 available to client communication manager 40 in a step 126. Next, in a sequence of steps 128-132, manager 40 may assemble a buffer of object data indicators of target objects on list 34. A step 128 verifies whether an ODI accumulation condition is met. In some embodiments, the ODI buffer may have a predetermined size (e.g., contain the ODIs of 100 target objects). The size of the ODI buffer may depend on the number of items on list 34. For example, the ODI buffer may hold the ODIs of a predetermined fraction (e.g., ½) of the objects in list 34 (if target list 34 contains only one target object, the ODI buffer may also contain only one ODI). In another example, ODIs may accumulate for a predetermined time interval (e.g. 1 minute). In some embodiments, the ODI buffer may include ODIs corresponding to multiple, possibly unrelated scan requests 42. For example, the ODI buffer may include ODIs corresponding to different iterations of the collaborative scans of distinct target objects.

If the ODI accumulation condition is met, communication manager 40 may proceed to a step 136. If no, in a step 130, manager 40 may instruct client scan engine 30 to compute an ODI 50 for a target object from list 34. Object data indicators computed in step 130 include initial ODIs (computed in a first iteration of a collaborative scan of a target object) and/or ODIs computed in response to ODI requests from server system 12 in subsequent iterations of the collaborative scan of the target object, as specified in server-side scan result 54. Initial ODIs for a target object may include, for example, a set of universal offset hashes of the target object (e.g., hashes of the first 32 bytes, 512 bytes, and 2 kB of a target object). A subsequent ODI for the same file may include, for example, a malware-identifying signature hash specified in the server-side scan result 54. In a step 132, manager 40 adds ODIs of the target object to the ODI buffer, and proceeds to step 128.

In a step 136, client communication manager 40 sends the contents of the ODI buffer to malware detection server system 12 over network 16. Next, in a step 138, manager 40 may receive the contents of a server report buffer comprising a set of server-side scan results 54, and may forward results 54 to risk assessor 36. In a step 140, for every result 54, risk assessor 36 determines whether the respective target object requires client-side scanning (e.g., if scan result 54 includes a client-side scan request, or if server system 12 could not determine the status of the respective target object), and if no, risk assessor 36 proceeds to a step 144. For every target object requiring a client-side scan, in a step 142 risk assessor 36 may instruct client scan engine 30 to perform the client-side part of the collaborative scan of the respective target object according to the respective server-side scan result 54. Step 142 may result in the client scan engine 30 producing client-side scan result 52 associated to the respective target object.

In a step 144, risk assessor 36 may check whether a condition for the termination of the collaborative scan in satisfied, and if no, return to step 128. In some embodiments, the collaborative scan is terminated when all target objects on list 34 have received a malware status assessment. In an alternative embodiment, the collaborative scan may be terminated after a predetermined number of iterations of client and/or server scanning steps performed for each target object, or after a predetermined time interval (e.g. 1 minute) has elapsed since the latest transmission of the contents of the ODI buffer (step 136), or since the receipt of scan request 42. If the termination condition is satisfied, in a step 146 client communication manager 40 may query malware detection server system 12 for the scanning status of target objects for which no server-side scan result 54 has yet been received. The operation of client malware scanner 18 may conclude with risk assessor 36 issuing scan report 38 in a step 148.

Figure 5:
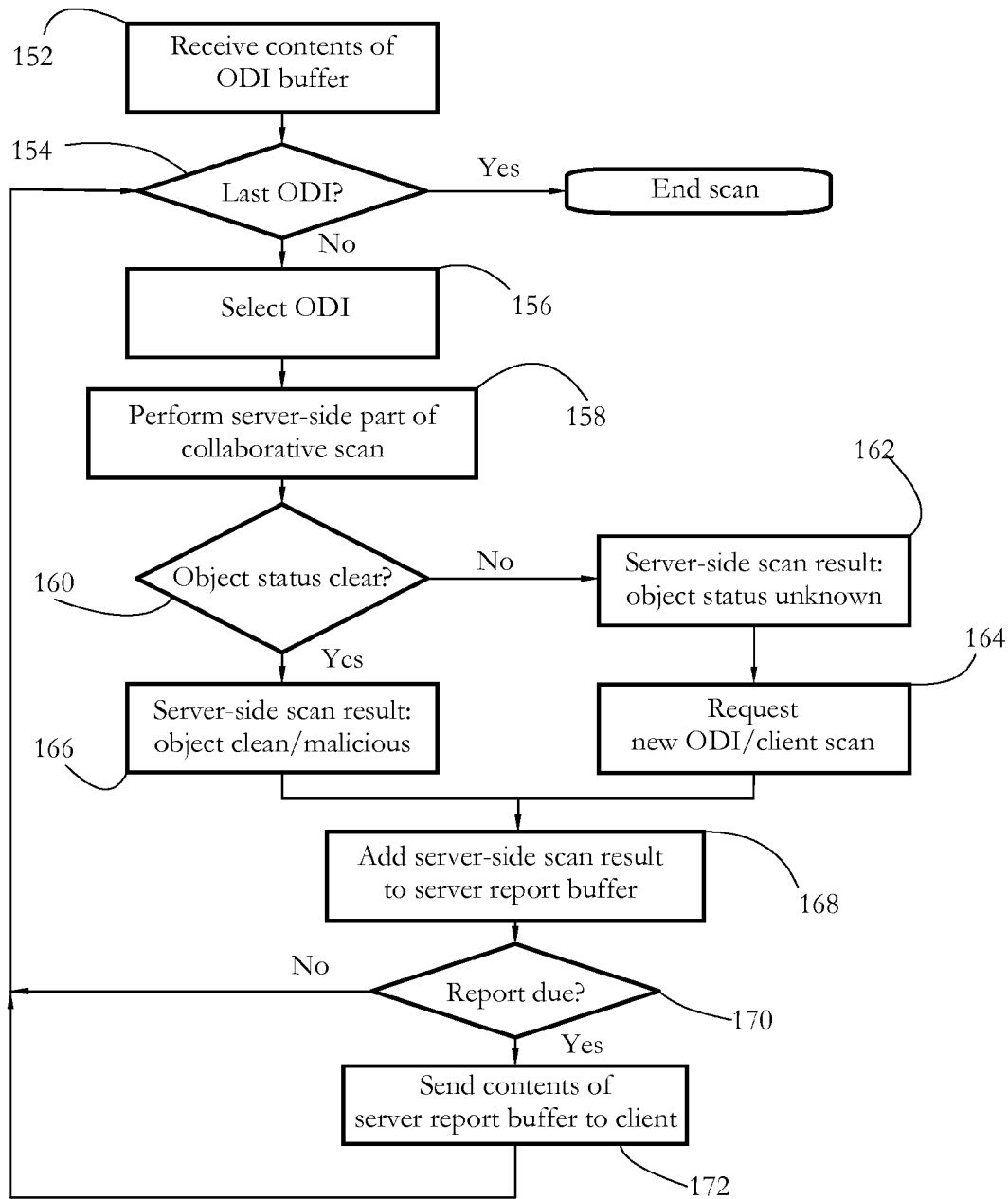
FIG. 5 shows an exemplary sequence of steps performed by the malware detection server system of FIGS. 1-2 within a client-server malware detection transaction according to some embodiments of the present invention.

In some embodiments, malware detection server system 12 (FIGS. 1-2) may conduct a plurality of malware-detection transactions with client computer systems 14a-c. FIG. 5 illustrates an exemplary sequence of steps performed by malware detection server system 12 for each malware detection transaction, according to some embodiments of the present invention. In a step 152, server communication manager 26 may initiate a malware detection transaction by receiving the contents of the ODI buffer from client communication manager 40 of a selected client computer system 14. Next, in a sequence of steps 154-170, manager 26 may assemble a server report buffer to be sent back to client communication manager 40 in response to the receipt of the ODI buffer. In a step 154, manager 26 checks whether all ODIs in the current ODI buffer have been analyzed, and if yes, manager 26 quits. If no, in a step 156 manager 26 may select an ODI corresponding to a target object from the ODI buffer.

In a step 158, manager 26 instructs server scan engines 28a-b to perform the server-side part of the collaborative scan of the target object according to the respective object's ODI, to produce server-side scan result 54. In some embodiments, malware-detection methods implemented by server scan engines 28a-b include hash lookup employing a reference of malware-identifying hashes stored in server malware database 24.

In an exemplary server-side part of the scan of a target object, engines 28a-b may try to match a hash of the target object (e.g. the hash of the first 512 bytes of the target object, or a malware-identifying signature hash requested from the client via a server-side scan result) to a reference set of hashes of malware-infected files. If no match is found, the target object may be considered clean according to server system 12. If a hash match is found, the target object may be labeled as infected, or suspect of infection, or of unknown status. In some embodiments, a match does not automatically imply infection, as there may be several files (some clean, some infected) that match the same hash. Also, in case of infection, there may be several malware agents or variants of the same agent that share the same hash, so the exact nature of infection may not be revealed by a hash match.

In order to label a target object as clean, some embodiments of server scan engines 28a-b may attempt to match a hash of the target object to a reference set of hashes of clean files, stored in server malware knowledgebase 24. Examples of such hashes are MD5 hashes of entire files, which are known not to be infected (e.g. original versions of executable files provided by software producers, etc.). A match to a reference hash of a clean file may signify that the respective target object is clean.

A step 160 determines whether the malware status of the target object is clear (e.g. clean or unambiguously infected) according to the result of the server-side part of the collaborative scan. If yes, a step 166 issues server-side result 54 including the clean or infected status of the target object, and an indicator of the infecting agent. If step 160 outputs a no, e.g. if the target object is only suspected of infection, or if the infected agent could not be determined, or if the status of the target object is unknown, a step 162 issues server-side result 54 specifying the unknown status of the target object, and a step 164 may formulate a new ODI request or client-side scan request in relation to the target object.

Step 164 may include a malware-specific decision process. In an exemplary situation, a target object has a universal offset hash value 0xF452364 on the first 2 kB of data. In the first iteration of the server-client scan of the object, server scan engines 28a-b have found a match for the fixed offset hash, signaling a possible infection with either of two viruses: V1 and V2. By consulting server malware database 24, engines 28a-b have also determined that Virus V1 is characterized by a signature CRC value 0x62362118 on a section of the target object bound by addresses 0x789 and 0xF542, while virus V2 is characterized by a signature CRC value 0x76234251 between addresses 0x4962 and 0x7564. In order to uniquely identify the nature of infection, step 164 may formulate server-side scan result 54 to include a ODI request for the two CRC's. In another exemplary situation, a universal offset hash of a target object matches a reference hash found in the malware knowledgebase 25, but the match alone does not imply infection, since the same hash also matches the hash of a legitimate, clean file. In order to unambiguously determine the malware status of the target object, emulation of the first 2 million instructions of the target object is to be performed. Consequently, step 164 may formulate server-side scan result 54 to include a request for client-side emulation. Parameters associated with the server-side malware-detection decision process (e.g., decision trees) may be stored in the server malware knowledgebase 24 and may be optimized and/or kept up to date to incorporate newly detected security threats.

A step 168 (FIG. 5) may add server-side scan result 54 to a server report buffer. Next, a step 170 may check whether a buffer accumulation condition is satisfied, and if no, return to step 154. For example, the server report buffer may accumulate a maximum number (e.g., 100) of server-side scan results, or may accumulate results 54 for a predetermined time interval (e.g. 1 minute). In another example, the size of the server report buffer may vary according to the size of the incoming ODI buffer (e.g. if the ODI buffer received in step 152 contains just one ODI, the server report buffer may also contain only one result 54). In some embodiments, the server report buffer may include server-side scan results 54 of target objects originating from multiple, possibly unrelated scan requests 42. For example, the server report buffer may include server-side scan results 54 corresponding to various iterations of the collaborative scans of distinct target files. When the buffer accumulation condition is satisfied, in a step 172 server communication manager 26 may send the contents of the server report buffer to client communication manager 40 of client computer system 14 (FIG. 3).

The exemplary systems and methods described above allow a malware detecting system to conduct a collaborative scan of a target data object (computer file or process), comprising a server-side scan and a coordinated client-side scan, and to assess the malware status of the target object according to the results of the client-side and server-side scans.

Conventional malware scanning methods include behavior-based methods and content-based methods. Behavior-based methods such as emulation are relatively computationally-intensive, while content-based methods such as hash lookup require less computation, but instead rely on the maintenance of a relatively large database of malware-identifying signatures. In some embodiments of the systems and methods described above, computationally-intensive malware detection methods may run on a client computer system, while data-intensive malware detection methods may be conducted on a corporate server. By assigning computationally intensive scanning tasks to the clients, the server system may successfully perform concurrent scanning transactions with numerous client computer systems.

The proliferation of malware agents has contributed to a steady increase in the size of malware signature databases, with millions of new signatures added every year, amounting to several tens of megabytes of data. The exemplary methods and systems described above allow storing the malware signature databases on the server, thus avoiding the delivery of data-heavy software updates from a corporate server to a large number of customers on a regular basis.

A large proportion of malware agents may be identified according to a single hash lookup. If the hash of a specific section of a target object matches a database-stored hash corresponding to an infected file, the target object may be labeled as infected or suspect of infection. Maintaining a database of hashes of infected files allows the methods and systems described above to detect malware infected target objects in just one round of server scanning, thus avoiding computationally-intensive client-side scans in a significant percentage of situations. Exemplary collaborative scans described above are configured to perform the server-side scan first, with the client-side following only if certain conditions are satisfied (e.g., if the malware agent infecting the target object is not known, or if infection cannot be established with certainty).

The size of files exchanged between client and malware detection server systems described above is kept to a minimum. Instead of sending entire files from the client to the server for server-side scanning, or sending entire detection routines from the server to the client for client-side scanning, the exemplary methods and systems described above are configured to exchange hashes (either fixed offset or signature) amounting to several bytes per target object, thus significantly reducing network traffic.

Performing a significant fraction of malware scanning centrally on the server, the systems and methods described above allow for the timely incorporation of signatures of newly detected threats and the maintenance of an up-to-date record of the frequency and network distribution of common malware at any given time. By contrast, in conventional malware detection wherein scanning is predominantly distributed to client computer systems, information gathering about new security threats may involve indirect methods (e.g., honeypots) so time-sensitive information may take significantly longer to reach the anti-malware software producers.

In exemplary systems and methods described above, collaborative malware scanning of a target object proceeds iteratively. The client and server may exchange several rounds of communication and scanning, before the malware status of the target object can be unambiguously determined. In an exemplary multi-round collaborative scan, an initial hash of a predefined section (e.g. first 2 kB) of the target object is matched against a database of malware-identifying hashes. Additional object data indicators of the target object, such as a set of hashes of additional file sections (e.g., first 32 bytes, first 512 bytes, etc.), and/or a filename, a file path, and a file size of the target object, may be used to narrow the number of matches to a minimum. If a match is found, but the source of infection cannot be determined exactly (e.g. if there are multiple matches corresponding to distinct malware agents), the server may request the computation of a new hash of the target object. The new hash is computed at the client, and sent to the server. If a new hash match is found which uniquely identifies the infecting agent, the collaborative scan may terminate. If infection still cannot be established with certainty, the server may request a new hash of the target object, or may request a client-side scan of the target object. The computationally-intensive client-side scan is typically performed last, to minimize the computational load of the client.

It will be clear to one skilled in the art that the above embodiments may be altered in many ways without departing from the scope of the invention. Accordingly, the scope of the invention should be determined by the following claims and their legal equivalents.

What is claimed is:

1. A malware detection system comprising at least one processor configured to form:
 a client scan engine configured to perform on a client computer system a client-side part of a collaborative scan of a target object to produce a client-side scan result, wherein the client-side part of the collaborative scan comprises emulating a code sequence of the target object in a virtual environment; and
 a client communication manager connected to the client scan engine and configured to:
  iteratively send a sequence of client-initiated hash lookup requests for the target object from the client computer system to a malware detection server system, each client-initiated hash lookup request including a hash of a section of the target object, and
  iteratively receive at the client computer system a sequence of server-side hash lookup results of a server-side part of the collaborative scan of the target object, wherein the server-side part of the collaborative scan comprises a sequence of hash lookups performed by the malware detection server system according to hashes of sections of the target object, wherein a client-initiated hash lookup request after a first hash lookup request in the sequence of client-initiated hash lookup requests is individually initiated by the client computer system in response to determining that a received server-side hash lookup result is inconclusive as to a malware status of the target object; and
 a risk assessor connected to the client communication manager, the risk assessor being configured to determine whether the target object is malicious according to the client-side part of the collaborative scan and the server-side part of the collaborative scan, the risk assessor being further configured to check whether a condition for a termination of the collaborative scan is satisfied.

2. The system of claim 1, wherein the client-side part of the collaborative scan further comprises decrypting at least part of the target object.

3. A malware detection method comprising:
 performing a client-side part of a collaborative scan of a target object on a client computer system to produce a client-side scan result, wherein the client-side part of the collaborative scan comprises emulating a code sequence of the target object in a virtual environment;
 iteratively sending a sequence of client-initiated hash lookup requests for the target object from the client computer system to a malware detection server system, each client-initiated hash lookup request including a hash of a section of the target object;
 iteratively receiving at the client computer system a sequence of server-side hash lookup results of a server-side part of the collaborative scan of the target object, wherein the server-side part of the collaborative scan comprises a sequence of hash lookups performed by the malware detection server system according to hashes of sections of the target object, wherein a client-initiated hash lookup request after a first hash lookup request in the sequence of client-initiated hash lookup requests is individually initiated by the client computer system in response to determining that a received server-side hash lookup result is inconclusive as to a malware status of the target object;

checking on the client computer system whether a condition for a termination of the collaborative scan is satisfied, and employing the client computer system to terminate the collaborative scan in response to determining that the condition for the termination of the collaborative scan is satisfied; and determining on the client computer system whether the target object is malicious according to the client-side part of the collaborative scan and the server-side part of the collaborative scan.

4. The method of claim 3, wherein the client-side part of the collaborative scan further comprises decrypting at least part of the target object.

5. A malware detection system comprising:

means for performing a client-side part of a collaborative scan of a target object on a client computer system, to produce a client-side scan result, wherein the client-side part of the collaborative scan comprises emulating a code sequence of the target object in a virtual environment;

means for iteratively sending a sequence of client-initiated hash lookup requests from the client computer system to a malware detection server system, each client-initiated hash lookup request including a hash of a section of the target object; and means for iteratively receiving at the client computer system a sequence of server-side hash lookup results of a server-side part of the collaborative scan of the target object, wherein the server-side part of the collaborative scan is performed by the malware detection server system according to hashes of sections of the target object, wherein a client-initiated hash lookup request after a first hash lookup request in the sequence of client-initiated hash lookup requests is individually initiated by the client computer system in response to determining that a received server-side hash lookup result is inconclusive as to a malware status of the target object, wherein the client computer system terminates the collaborative scan in response to checking on the client system whether a condition for a termination of the collaborative scan is satisfied, and wherein the client computer system determines whether the target object is malicious according to the client-side part of the collaborative scan and the server-side part of the collaborative scan.

6. A malware detection system comprising at least one processor configured to form:

a server communication manager configured to perform a plurality of malware detection transactions with a plurality of client computer systems, a malware detection transaction comprising:

iteratively receiving at a malware detection server system from a client computer system a sequence of client-initiated hash lookup requests for a target object, each client-initiated hash lookup request including a hash of a section of the target object, and iteratively sending a sequence of server-side hash lookup results of a server-side part of a collaborative scan of the target object from the malware detection server system to the client computer system, wherein the collaborative scan includes the server-side part and a client-side part performed by the client computer system, wherein the client-side part of the collaborative scan comprises emulating a code sequence of the target object in a virtual environment; and a server scan engine connected to the server communication manager and configured to perform the server-side part of the collaborative scan on the malware detection server system according to hashes of sections of the target object, wherein a client-initiated hash lookup request after a first hash lookup request in the sequence of client-initiated hash lookup requests is individually initiated by the client computer system in response to determining that a received server-side hash lookup result is inconclusive as to a malware status of the target object, wherein the client computer system terminates the collaborative scan in response to checking on the client system whether a condition for a termination of the collaborative scan is satisfied, and wherein the client computer system determines whether the target object is malicious according to the client-side part of the collaborative scan and the server-side part of the collaborative scan.

7. The system of claim 6, wherein the client-side part of the collaborative scan comprises decrypting at least part section of the target object.

8. A malware detection method comprising performing a plurality of client-initiated malware detection transactions with a plurality of clients, each client-initiated malware detection transaction comprising:

iteratively receiving at a malware detection server system a sequence of client-initiated hash lookup requests for a target object from a client computer system, each client-initiated hash lookup request including a hash of a section of the target object;

performing a server-side part of a collaborative scan of the target object on the malware detection server system, wherein the collaborative scan includes the server-side part and a client-side part performed by the client computer system, wherein the first server-side part of the collaborative scan is performed according to hashes of sections of the target object, and wherein the client-side part of the collaborative scan comprises emulating a code sequence of the target object in a virtual environment; and iteratively sending a sequence of server-side hash lookup results of the server-side part of the collaborative scan from the malware detection server system to the client computer system;

wherein a client-initiated hash lookup request after a first hash lookup request in the sequence of client-initiated hash lookup requests is individually initiated by the client computer system in response to determining that a server-side hash lookup result is inconclusive as to a malware status of the target object wherein the client computer system terminates the collaborative scan in response to checking on the client system whether a condition for a termination of the collaborative scan is satisfied, and wherein the client computer system determines whether the target object is malicious according to the client-side part of the collaborative scan and the server-side part of the collaborative scan.

9. The method of claim 8, wherein the client-side part of the collaborative scan comprises decrypting at least part of the target object.

10. A malware detection system comprising:

means for iteratively receiving at a malware detection server system a sequence of client-initiated hash lookup requests for a target object from a client computer system, each client-initiated hash lookup request including a hash of a section of the target object;

means for performing a server-side part of a collaborative scan of the target object, wherein the collaborative scan includes the server-side part and a client-side part performed by the client computer system, wherein the server-side part of the collaborative scan is performed according to hashes of sections of the target object, and wherein the client-side part of the collaborative scan comprises emulating a code sequence of the target object in a virtual environment; and means for iteratively sending a sequence of server-side hash lookup results of the server-side part of the collaborative scan of the target object from the malware detection server system to the client computer system;

wherein a client-initiated hash lookup request after a first hash lookup request in the sequence of client-initiated hash lookup requests is individually initiated by the client computer system in response to determining that a received server-side hash lookup result is inconclusive as to a malware status of the target object wherein the client computer system terminates the collaborative scan in response to checking on the client system whether a condition for a termination of the collaborative scan is satisfied, and wherein the client computer system determines whether the target object is malicious according to the client-side part of the collaborative scan and the server-side part of the collaborative scan.

11. The system of claim 1, wherein checking whether the condition for the termination of the collaborative scan is satisfied comprises determining whether a predetermined amount of time has elapsed since a latest transmission from the client computer system to the malware detection server system of the contents of an object data indicator buffer containing a plurality of target object data indicators for a plurality of target objects.

12. The system of claim 1, wherein checking whether the condition for the termination of the collaborative scan is satisfied comprises determining whether a number of iterations of the collaborative scan exceeds a predetermined threshold.

13. The system of claim 1, wherein checking whether the condition for the termination of the collaborative scan is satisfied comprises determining whether all target objects on a list comprising a plurality of target objects have received a malware status assessment.

14. The system of claim 1, wherein the client communication manager is further configured to query the malware detection server system, in response to determining that the condition for the termination of the collaborative scan is satisfied, for a scanning status of target objects for which no server-side scan result has yet been received.

15. The system of claim 1, wherein the client communication manager is configured to assemble a buffer containing hashes for a plurality of target objects of the client computer system, and transmit the contents of the buffer to the malware detection server system in response to determining that a buffer accumulation condition is met.

16. The system of claim 1, wherein the client communication manager is configured to receive server-side hash lookup results as part of at least one server report buffer comprising a plurality of server-side hash lookup results for a plurality of target objects.

17. The system of claim 6, wherein checking whether the condition for the termination of the collaborative scan is satisfied comprises determining whether a predetermined amount of time has elapsed since a latest transmission from the client computer system to the malware detection server system of the contents of an object data indicator buffer containing a plurality of target object data indicators for a plurality of target objects.

18. The system of claim 6, wherein checking whether the condition for the termination of the collaborative scan is satisfied comprises determining whether a number of iterations of the collaborative scan exceeds a predetermined threshold.

19. The system of claim 6, wherein checking whether the condition for the termination of the collaborative scan is satisfied comprises determining whether all target objects on a list comprising a plurality of target objects have received a malware status assessment.

20. The system of claim 6, wherein the server communication manager is further configured to receive a query from the client computer system, in response to the client computer system determining that the condition for the termination of the collaborative scan is satisfied, for a scanning status of target objects for which no server-side scan result has yet been received by the client computer system.

21. The system of claim 6, wherein the server communication manager is configured to receive from the client computer system the contents of a buffer containing hashes for a plurality of target objects of the client computer system, the contents of the buffer being transmitted by the client computer system to the malware detection server system in response to the client computer system determining that a buffer accumulation condition is met.

22. The system of claim 6, wherein the server communication manager is configured to assemble a server report buffer comprising a plurality of server-side hash lookup results for a plurality of target objects.

* * * * *